US006436515B1

(12) United States Patent
Ohbayashi et al.

(10) Patent No.: US 6,436,515 B1
(45) Date of Patent: Aug. 20, 2002

(54) INK JET RECORDING SHEET

(75) Inventors: Keiji Ohbayashi; Yoichi Saito, both of Hino; Kenichi Yoshitsuka, Odawara, all of (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 09/547,417

(22) Filed: Apr. 11, 2000

(30) Foreign Application Priority Data

Apr. 13, 1999 (JP) .......................................... 11-105318

(51) Int. Cl.[7] ............................ B32B 27/14; B32B 3/00

(52) U.S. Cl. ........................ 428/195; 428/206; 428/220; 428/323; 428/332

(58) Field of Search ................................ 428/195, 206, 428/220, 323, 332

(56) References Cited

U.S. PATENT DOCUMENTS 6,165,606 A * 12/2000 Kasahara et al. ........... 428/323
6,217,166 B1 * 4/2001 Saito et al. ................. 347/100
6,248,432 B1 * 6/2001 Moronuki et al. ....... 428/304.4

FOREIGN PATENT DOCUMENTS

| | | |
|---|---|---|
| EP | 495617 | 7/1992 |
| EP | 800930 | 10/1997 |
| EP | 890447 | 1/1999 |

OTHER PUBLICATIONS

European Search Report EP 00 30 3073.

* cited by examiner

*Primary Examiner*—Bruce H. Hess
*Assistant Examiner*—B. Shewareged
(74) *Attorney, Agent, or Firm*—Bierman, Muserlian and Lucas

(57) ABSTRACT

An ink jet recording sheet having a support and an ink absorption layer provided on the support wherein a center line average roughness (Ra) is 0.8 to 4.0 μm, measured at a standard length of 2.5 and a cut-off value of 0.8 mm of the surface of the ink jet recording sheet on the ink absorption layer side, which is specified in JISB-0601, and a 60-degree specular gloss of the ink jet recording sheet is 10 to 30 percent, which is specified in JIS-Z8741.

19 Claims, No Drawings

INK JET RECORDING SHEET

FIELD OF THE INVENTION

The present invention relates to an ink jet recording sheet for producing high image quality, and specifically to an ink jet recording sheet which provides high quality ink jet prints which result in no imagewise gloss difference through minimization of glare due to the surface gloss.

BACKGROUND OF THE INVENTION

Accompanying the marked technical innovation of ink jet recording in recent years, ink jet print quality is approaching that obtained by conventional silver halide photography. Print quality obtained utilizing ink jet recording is dependent on printers, inks, and recording sheets. In terms of image quality, recent technical innovations of the former two play a major role, and the performance of the ink jet recording sheet (hereinafter occasionally referred to as a recording sheet) is now very important because it plays a critical role to differentiate final print quality.

In order to obtain prints close to silver halide photographic prints employing ink jet recording, various improvements have been carried out for recording sheets.

Ink jet recording sheets are mainly divided into the following two groups, one is comprised of a support such as paper which is inherently ink absorptive, and the other comprises a support having thereon an ink absorption layer. However, the former is difficult to produce high quality prints because high maximum density is not obtained due to the direct penetration of the ink into the support, and the support itself absorbs the ink solvent, resulting in formation of marked imagewise wrinkling, and the latter is preferable.

Known as two major types of ink absorption layers, provided on a support, are a swelling type ink absorption layer and a void type ink absorption layer.

The swelling type ink absorption layer is comprised of hydrophilic polymers such as gelatin, polyvinyl alcohol, polyvinylpyrrolidone, polyethyleneoxide and the like, as the main component.

The void type ink absorption layer which comprises void in a layer is prepared employing several types of production methods. The representative layer is comprised of a small amount of hydrophilic polymers and a large amount of fine particles. Voids are formed between said fine particles, into which ink is absorbed.

Texture occasionally is a personal preference. However, depending on the purpose of the print, glossiness, which is necessary to obtain high quality prints, and other properties, are occasionally required.

For instance, there are such demands that fingerprints do not show; staining due to adhesive materials such as paste occurs minimally, excessive reflection of light, which hinders viewing, is decreased, and the like.

The semi-matte surface is generally obtained by forming a surface unevenness in the order of 1 μm, for example. When ink jet recording is carried out employing a recording sheet of which surface is appropriately roughened, problems occur in which the glossiness varies in accordance with the image and tends not to be uniform. This problem particularly deteriorates the print quality, and thus, it is necessary to overcome it.

The cause of such uneven glossiness is not yet fully understood. However, it is assumed that when ink jet recording is carried out, low volatile organic solvents remain in the ink absorption layer and thus the fine roughness in the image area on the surface is different from that of the non-image area.

When such an imagewise non-uniform gloss difference is formed, glare results on the image surface. Consequently, the resulting prints do not look natural and are not accepted as high quality prints.

When a support does not absorb ink solvents, this problem becomes more pronounced. However, even when the support absorbs an ink, slight differences in roughness on the surface are formed via said ink jet recording and imagewise gloss difference results.

SUMMARY OF THE INVENTION

In view of the foregoing, the present invention was achieved. An object of the present invention is to provide an ink jet recording sheet which does not result in distinct imagewise gloss differences between the printed area and the non-printed area, minimizes glare due to surface gloss, and further is capable of forming high quality images without uneven image.

The aforementioned object of the present invention is achieved by the embodiments described below.

1. In an ink jet recording sheet which is subjected to surface treatment so as to form a fine grained surface having irregular or regular textured roughness on the surface on the ink absorption layer surface side of a support, an ink jet recording sheet characterized in having a center line average roughness (Ra) of 0.8 to 4.0 μm, measured at a standard length of 2.5 and a cut-off value of 0.8 mm of the surface on the ink absorption layer side, which is specified in JISB-0601 and a 60-degree specular gloss of 10 to 30 percent, specified in JIS-Z8741.

2. An ink jet recording sheet characterized in having a center line average roughness (Ra) of the surface on the ink absorption layer side of 0.8 to 4.0 μm measured at a standard length of 2.5 mm and a cut-off value of 0.8 mm, specified in JISB-0601, and a 60-degree specular gloss of 10 to 30 percent, specified in JIS-Z8741, while comprising said ink absorption layer on a support which is subjected to surface treatment so as to form a fine grained surface having irregular or regular textured roughness.

3. An ink jet recording sheet described in 1. or 2. above, characterized in having a center line average roughness (Ra) of a support of 1.0 to 5.0 μn, measured at a standard length of 2.5 mm and a cut-off value of 0.8 mm, specified in JISB-0601.

4. An ink jet recoding sheet described in 1., 2., or 3. above, characterized in that a support is comprised of paper laminated by a polyolefin resin on the both sides.

5. An ink jet recording sheet described in claim 1, 2, 3, or 4, above, characterized in that an ink absorption layer is a porous film having voids therein.

DETAILED DESCRIPTION OF THE INVENTION

The present invention will be described in further detail below.

The ink jet recording sheet of the present invention comprises an ink absorption layer on a support.

Employed as the support used in the present invention may be a water absorption support as well as a water non-absorption support. However, a water non-absorption support is preferably employed because it does not result in wrinkling and a semi-matte surface is readily obtained.

In case that the ink jet recording sheet has a water absorption support, it sometimes results in wrinkling because the support absorbs ink solvent and in lowering the image density because dyes adsorbed in the ink layer insinuate into the support during storage of the inked sheet.

In case that the ink jet recording sheet has a water non-absorption support, ink jet print having high quality appearance is obtained without such problems mentioned above.

As for the water absorption support, a paper support comprised of natural pulp as the main component is representative. However, said support may be comprised of a mixture of natural pulp and synthetic pulp.

Listed as water non-absorption supports are plastic resin films, and also supports comprised of paper which are laminated with a plastic resin film on both sides.

Listed as plastic resin film supports are polyester film, polyvinyl chloride film, polypropylene film, cellulose triacetate film, polystyrene film, and the like.

Either transparent or translucent plastic resin films may be employed. However, those, which are transparent, are preferred.

Preferred supports in the present invention are those comprised of paper, which are laminated with a plastic resin on both sides, and the most preferred supports are those in which both sides of paper are laminated with a polyolefin resin.

Specifically, recording sheets, which are comprised of a paper support laminated with polyolefin resins such as polyethylene and the like on both sides, having thereon an ink absorption layer, are preferable, because their cost is relatively low compared to plastic films, and they are capable of producing high quality prints approaching the quality of silver halide photographic prints in terms of depth, flexibility, smoothness, glossiness, and the like.

The particularly preferred supports in the present invention, in which both sides of the paper are laminated with said plastic resin, will be described below.

Paper, which is employed as a support in the present invention, is comprised of wood pulp as the main raw material, and if desired, in addition to the wood pulp, employed is synthetic pulp such as polypropylene and the like, as well as synthetic fiber such as nylon, polyester and the like. Employed as wood pulp may be, for example, any of LBKP, LBSP, NBKP, NBSP, LDP, NDP, LUKP, and NUKP. However, it is preferable to employ a larger amount of LBKP, NBSP, LBSP, NDP, and LDP which comprise a larger ratio of short fiber components. Content ratio of LBSP and/or LDP is preferably 10 to 70% by weight.

Preferably employed as the aforementioned pulp is chemical pulp (sulfate pulp and sulfite pulp) which comprise minimal impurities. Further, pulp, which is subjected to bleaching to enhance whiteness, is also advantageous.

Into paper may suitably be incorporated sizing agents such as higher fatty acids, alkyl ketene dimers, and the like, white pigments such as calcium carbonate, talc, titanium oxide, and the like, paper strength enhancing agents such as starch, polyacrylamide, polyvinyl alcohol, and the like, fluorescent whitening agents, moisture maintaining agents such as polyethylene glycol, and the like, dispersing agents, softening agents such as tertiary ammonium compound, and the like.

The freeness of pulp employed for paper making is preferably between 200 and 500 cc in accordance with CSF Standard. Further, the fiber length after beating is preferably between 30 and 70 percent which is the sum of 24-mesh residual weight percent and 42-mesh residual weight percent specified in JIS-P-8207. Still further, 4-mesh residual weight percent is preferably no more than 20 weight percent.

The weight of paper is preferably between 50 and 250 g/m$^2$, and is most preferably between 70 and 200 g/m$^2$. The thickness of base paper is preferably between 50 and 210 $\mu$m.

During the paper making stage or after paper making, the paper may be further calendered and smoothened. Paper density is commonly between 0.7 and 1.2 g/m$^2$ (JIS-P-8118). Further, the paper stiffness is preferably between 20 and 200 g under conditions specified in JIS-P-8143.

Surface sizing agents may be applied onto the surface of the paper. Employed as surface sizing agents may be the same as those described above, which can be incorporated into the base paper.

The pH of said paper, when measured employing a hot water extraction method specified in JIS-P-8113, is preferably between 5 and 9.

Plastic resins, which are employed to laminate both sides of said paper, will now be described below.

Preferably employed as plastic resins for this purpose are polyolefins such polyethylene, polypropylene, polyisobutylene, ethylene, and copolymers which are comprised of propylene as their main component. Polyethylene is particularly preferred.

The particularly preferred polyethylene is described below.

Polyethylene, which is employed to laminate both surfaces of paper, is mainly low density polyethylene (LDPE) and/or high density polyethylene (HDPE). However, other LDPE, polypropylene, and the like may be employed.

Specifically, a preferred polyolefin layer on the coating layer side is one in which translucency and whiteness is improved by adding rutile or anatase type titanium oxide to the polyolefin. The amount of titanium oxide is commonly between 3 and 20 percent by weight with respect to polyolefin, and is preferably between 4 and 13 percent by weight.

In order to adjust background whiteness, high heat resistant pigments and fluorescent whitening agents may be incorporated into the polyolefin layer.

Listed as color pigments may be, for example, ultramarine blue, iron blue, cobalt blue, phthalocyanine blue, manganese blue, serurian blue, tungsten blue, molybdenum blue, anthraquinone blue, and the like.

Cited as fluorescent whitening agents are, for example, dialkylaminocoumarin, bisdimethylaminostilbene, bismethylaminostilbene, 4-alkoxy-1,8-naphthalenedicarboxylic acid-N-alkylimide, bisbenzoxazolylethylene, dialkylstilbene, and the like.

The employed amount of polyethylene on both sides of the base paper is determined to minimize curl at low and high humidity, after being provided with the ink absorption layer and the backing layer. Commonly, however, the thickness of the polyethylene layer on the ink absorption layer coating side is between 15 and 40 $\mu$m, while that on the backing layer side is in the range of 10 to 30 $\mu$m.

Further, the aforementioned polyethylene laminated paper support preferably has the following properties.

(1) Tensile strength: preferably 2 to 30 kg in the longitudinal direction, and 1 to 20 kg in the lateral direction, employing a method, specified in JIS-P-8113.

(2) Tearing strength: preferably 10 to 20 g in the longitudinal direction and 20 to 200 g in the lateral direction, employing a method, specified in JIS-P-8116.

(3) Compression elastic modulus $\geqq 9.8\times10^7$ Pa.

(4) Translucency: at least 80 percent, and most preferably 85 to 98 percent when measured employing a method specified in JIS-P-8138.

(5) Whiteness: preferably L*=80 to 95, a*=−3 to +5, and b*=−6 to +2, wherein L*, a*, and b* are specified in JIS-Z-8729.

(6) Clark stiffness: the preferred support has a Clark stiffness of the recording sheet in the conveyance direction of 50 to 300 $cm^2/100$.

(7) Moisture content in the base paper: preferably 4 to 10 percent by weight in core paper.

In one of the embodiment of the present invention, the ink recording sheet has a center line average roughness (Ra) of 0.8 to 4.0 $\mu$m, measured at a standard length of 2.5 mm and a cut-off value of 0.8 mm of the surface of the ink jet recording sheet on the ink absorption layer side, which is specified in JISB-0601, and also has a 60-degree specular gloss of surface of the ink jet recording sheet on the ink absorption layer side of 10 to 30 percent, which is specified in JIS-Z8741. The surface at the ink absorption layer side is fine grained face having irregular or regular, and is a face having a center line average roughness (Ra) of 0.8 to 4.0 $\mu$m, measured at a standard length of 2.5 mm and a cut-off value of 0.8 mm, specified in JISB-0601 and also having a 60-degree specular glossiness of 10 to 30 percent in accordance with JIS-Z8741.

Due to such face, surface glossiness suitably decreases and undesirable glare is visually minimized. That is, the surface glossiness is suitably reduced and undesirable glare decreases and in addition thereto, when ink jet recording is carried out, difference in glossiness between the printed area and the non-printed area is minimized. Thus, visually, high quality prints, without unevenness, are obtained. When said Ra is less than 0.8 $\mu$m, the effect which minimizes the surface glare is lost, while when said Ra exceeds 4.0 $\mu$m, ink tends to collect in the cavities and mottle-like non-uniformity tends to occur. Further, when the ink absorption layer is a stiff porous layer having voids, in the range of Ra exceeding 4.0 $\mu$m, the layer tends to suffer cracking during production. The preferred range of Ra is between 0.9 and 3.0 $\mu$m.

The grained surface has 5 to 30 concave and convex having height difference of, for example, 3 to 20 $\mu$m in a distance of 3 mm. When the grained surface has regular shape, bit is preferred to have 5 to 15 concave and convex having height difference of 5 to 20 $\mu$m in a distance of 3 mm, and when the grained surface has irregular shape, it is preferred to have 10 to 30 concave and convex having height difference of 5 to 20 $\mu$m in a distance of 3 mm.

Surface properties as obtained by the present invention are not obtained only by incorporating conventional matting agents conventionally employed in an even ink absorption layer.

When the matting agent conventionally employed is incorporated, convex states are mainly formed on the ink absorption layer. When it is intended to some extent to control glossiness only utilizing these convex states, it becomes necessary to use matting agents which have a particle diameter much larger than those described above. When a matting agent, having a relatively large particle diameter, is employed, the resulting layer tends to suffer from abrasion, and a pleasant surface texture is lost. Accordingly, a method, in which a matting agent is incorporated into the ink absorption layer, is not capable of satisfying requirements for both the surface roughness and the glossiness of the present invention.

The recording sheet of the present invention is obtained by providing roughness having specified values, which is different from that obtained by employing conventional matting agents.

The recording sheet of the present invention has regular-shaped or irregular-textured roughness comprised of relatively large values. For example, said roughness may be obtained by applying an ink absorption layer onto a support which has been subjected to previous embossing treatment, or by embossing the surface after applying the ink absorption layer onto a support having a smooth surface. However the former is preferred because it is difficult to provide uniform roughness when the ink absorption layer is subjected to post-embossing treatment.

And when the ink absorption layer is a relatively stiff porous layer, the former is particularly preferred.

In case that the an ink layer is provided on a support which has been subjected to previous embossing treatment, surface roughness Ra of the support is necessary to be higher than the difference of concave and convex height on grained surface at ink absorption layer, preferably, for example, 1.0 to 5.0 $\mu$m.

In the present invention a 60-degree specular glossiness at the ink absorption layer is 10 to 30 percent in accordance with JIS-Z8741, which is controlled by roughness of the support, fine textile of ink absorption layer itself or matting agent employed auxiliary.

When the glossiness is less than 10 percent, unsharp images tends to be formed due to an excessively high degree of matte surface, and after ink jet recording, uneven gloss (glare) are evident due to slight differences in glossiness.

On the other hand, when the glossiness exceeds 30 percent, generally the glossiness of the image surface is high and may not be considered to be a semi-matte surface.

The glossiness in such a range is obtained by making the uppermost surface layer of the ink absorption layer as a uniform constitution as possible so that unnecessary fine particles, which decrease gloss, are minimized as much as possible.

A so-called matting agent may be incorporated into the aforementioned uppermost surface of the ink absorption layer. However, said matting agent should be employed only in such a range that the gloss is not markedly decreased. Further, said matting agent, commonly having an average particle diameter of 5 to 30 $\mu$m, is preferably employed.

For particularly preferred supports, which are laminated on both sides with polyolefin resins, the surface is preferably subjected to embossing after the base paper is laminated with polyolefin resins.

A representative method, in which roughness is formed on the polyolefin resin surface in advance employing embossing, is carried out in such a manner that after extruding and applying a melted polyolefin resin onto the base paper, the resultant coating is brought into pressure contact with an embossing roller to form a fine roughness pattern.

Said pattern embossing methods include one in which a resin coated paper, obtained by melt extrusion, is subjected to an embossing calendering treatment at near room temperature, and the other in which, during extruding and applying the polyolefin resin, roughness is formed employing a cooling roller on which surface a concave and convex pattern is carved, while cooling. The latter is preferred because embossing can be carried out at a relatively low pressure and more accurate and uniform embossing can be achieved.

The relationship between the support surface and the roughness of the ink absorption layer depends on properties of said ink absorption layer. When the ink absorption layer has a high rate of ink absorption and said ink absorption layer is comprised of a porous layer containing voids, the difference in height on the ink absorption layer surface tends to decrease due to the increase in thickness of the dried layer than the support surface.

In one of the preferred embodiment of the invention the support has roughness which exhibits a center line average roughness (Ra) of 1.0 to 5.0 $\mu$m, measured at a standard length of 2.5 mm and a cut-off value of 0.8 mm, specified in JISB-0601. The preferred Ra of the support is between 1.0 and 4.0.

In the recording sheet of the present invention which is prepared by employing such a support, it is finally required that the surface on the ink absorption layer side has a specular glossiness of 10 to 30 percent in accordance with JIS-Z8741, and the aforementioned roughness is preferably formed on the surface of said ink absorption layer.

The other embodiment of the invention is described below.

The ink jet recording medium comprises an ink absorption layer provided on a support, wherein the support has roughness which exhibits a center line average roughness (Ra) of 1.0 to 5.0 $\mu$m, measured at a standard length of 2.5 mm and a cut-off value of 0.8 mm, specified in JISB-0601, and the ink jet recording medium has, at the ink absorption layer, roughness which exhibits a center line average roughness (Ra) of 1.0 to 5.0 $\mu$m, measured at a standard length of 2.5 mm and a cut-off value of 0.8 mm, specified in JISB-0601 and a 60-degree specular glossiness of 10 to 30 percent in accordance with JIS-Z8741.

Next, the ink absorption layer will be described. The ink absorption layer may be provided on one or both sides of the support. When the ink absorption layers are provided on the both sides, they may be the same or different.

The ink absorption layers, as described above, are mainly divided into two types, a swelling layer type ink absorption layer and a void type ink absorption layer.

The advantage of the swelling type ink absorption layer is to produce high glossiness, to absorb large volume of ink as far as polymer swells because the layer contains swelling polymer, and to be prepared at low cost. However light fastness is inferior because of employing swelling polymer.

On the other hand, advantage of the void type ink absorption layer is that an ink absorption speed is high and therefore uneven image does not tend to occur at printing, the surface appears dry state and both of water proof and ink absorption speed are satisfied at the same time.

In the present invention the void type ink absorption layer is preferable in view of high image quality due to high absorption and high drying property.

The swelling type ink absorption layer is comprised mainly of hydrophilic polymers which swell in an ink solvent. Listed as such hydrophilic polymers are gelatin (alkali process gelatin, acid process gelatin, gelatin derivatives in which the amino groups are blocked employing phenyl isocyanate, phthalic anhydride, and the like), polyvinyl alcohol (preferably having an average degree of polymerization of 300 to 4000 and a degree of saponification of 80 to 99.5 percent), polyvinylpyrrolidone, polyethylene oxide, hydroxyethyl cellulose, agar, Pullulan, dextran, acrylic acid, carboxymethyl cellulose, casein, alginic acid, and the like. Two types of these or more may be employed in combination.

Fine particles, such as fine inorganic particles or fine organic particles, and the like, may be incorporated into the swelling type ink absorption layer in the range in which the swelling properties of the hydrophilic polymers are not adversely affected, and the content is commonly no more than 100 percent by weight with respect to the hydrophilic binder.

The amount of hydrophilic polymers employed in the swelling layer is commonly between 3 and 20 g per $m^2$ of the recording sheet, and is preferably between 5 and 15 g.

The void type ink absorption layer which has voids in the ink absorption layer, is preferably comprised of a porous film having a void layer comprising fine inorganic particles and a hydrophilic polymer in a small amount.

Listed as examples of such fine inorganic particles may be white inorganic pigments such as precipitated calcium carbonate, heavy calcium carbonate, magnesium carbonate, kaolin, clay, calcium sulfate, barium sulfate, titanium dioxide, zinc oxide, zinc hydroxide, zinc sulfide, zinc carbonate, hydrotalcite, aluminum silicate, diatomaceous earth, calcium silicate, magnesium silicate, synthetic noncrystalline silica, colloidal silica, alumina, colloidal alumina, false boehmite, aluminum hydroxide, lithopone, zeolite, magnesium hydroxide, and the like.

Primary particles of such fine inorganic particles may be used without any treatment. Further, those in a state of secondary coagulated particles may also be used.

In the present invention; from the viewpoint of being capable of forming particularly fine voids, silica or false boehmite is preferred. Further, silica, having an average particle diameter of no more than 100 nm, which is synthesized employing a gas phase method, is particularly preferred because the effects of the present invention are exhibited more prominently. The average particle diameter means an average particle diameter of primary particle or secondary coagulated particles when the particles exist in the form of primary particles or secondary coagulated particles in the ink absorption layer, respectively.

The average particle diameter of said fine inorganic particles is obtained as follows. Particles themselves, or the cross-section or the surface of a void layer is observed employing an electron microscope, and diameters of 100 randomly sampled particles are recorded. Then the average diameter is obtained as a simple average (a number average). The particle diameter of each particle as described herein is the diameter of an assumed circle which has the same area as the projection area of the particle.

Employed as hydrophilic polymers employed in the void layer are those which are employed in the swelling type ink absorption layer. However, the preferred hydrophilic polymer is polyvinyl alcohol.

Polyvinyl alcohols, which are preferably employed in the present invention, include, other than common polyvinyl alcohol obtained by hydrolyzing polyvinyl acetate, modified polyvinyl alcohols such as polyvinyl alcohol in which the terminals are subjected to cationic modification, modified polyvinyl alcohol comprising an anionic group, and the like.

Polyvinyl alcohol having an average degree of polymerization of at least 300, which is obtained by hydrolyzing vinyl acetate, is preferably employed, and particularly one having a degree of polymerization of 1,000 to 5,000 are preferably employed.

Polyvinyl alcohol having a saponification ratio of 70 to 100 percent is preferred and one having a saponification ratio of 80 to 99.5 percent is particularly preferred.

Ratio of inorganic fine particles to hydrophilic binder employed in the ink absorption layer is around 2:1 to 10:1, and particularly 3:1 to 8:1 is preferable. By making the ratio of the inorganic fine particles to hydrophilic binder as high as mentioned above, high void ratio in the ink absorption layer can be obtained. The preferable void ratio is 40 to 80%, particularly preferably 50 to 70%. The void ratio is defined by the following formula;

Void ratio =100×(Total dry thickness−coated solid thickness)/Total dry thickness Further, when the aforementioned void layer comprises polyvinyl alcohol as the hydrophilic polymer, it is preferred that such a hardening agent as epoxy compound, boric acid or its derivative is incorporated to improve the film forming properties of the film as well as to increase the film strength. The preferable examples are boric acid or its derivative. Boric acids or salts thereof are oxygen acids and salts thereof having a boron atom as the central atom, and specifically include ortho-boric acid, meta-boric acid, hypoboric acid, tetraboric acid, pentaboric acid, and salts thereof.

The employed amount of boric acids or salts thereof may vary widely depending on the amount of fine inorganic particles and hydrophilic polymers in the coating composition. However, said amount is commonly between 1 and 60 percent by weight of the hydrophilic polymers, and is preferably between 5 and 40 percent by weight.

In the present invention, an ink absorption layer is preferably comprised of a porous film having voids, because the rate of ink absorption is high which minimizes image unevenness, and the generation of curl is relatively small due to the relatively small amount of the employed hydrophilic polymer.

Various types of additives, other than those described above, may be incorporated into the ink absorption layer of the ink jet recording sheet of the present invention.

Of them, cationic mordants are preferred which improve water resistance, as well as moisture resistance, after printing.

Employed as cationic mordants are polymer mordants having a primary, secondary, or tertiary amino group, as well as quaternary ammonium bases. However, polymer mordants having the quaternary ammonium bases are preferred due to minimal discoloration as well as minimal degradation of light fastness.

Preferred polymer mordants are obtained as homopolymers of monomers having the aforementioned quaternary ammonium bases, copolymers or condensation polymers with other monomers.

Other than those described above, incorporated also may be various types of additives known in the art, such as, for example, UV absorbers described in Japanese Patent Publication Open to Public Inspection Nos. 57-74193, 57-87988, and 62-261476, anti-discoloring agents described in Japanese Patent Publication Open to Public Inspection Nos. 57-74192, 57-87989, 60-72785, 61-146591, 1-95091, 3-13376, and others, various anionic, cationic, or nonionic surface active agents, fluorescent whitening agents described in Japanese Patent Publication Open to Public Inspection Nos. 59-42993, 59-52689, 62-280069, 61-242871, 4-219266, and others, antifoaming agents, lubricants such as diethylene glycol and the like, antiseptics, thickening agents, antistatic agents, matting agents, and the like.

When the ink absorption layer is applied onto a support, for the purpose of increasing adhesion strength between the surface and the coating layer, said support is preferably subjected to corona discharge treatment, subbing treatment, and the like.

In order to minimize curl, as well as adhesion and ink transfer between stacked sheets immediately after printing, various types of backing layers may be provided on the ink absorption layer side and the reverse side of the ink jet recording sheet of the present invention.

The constitution of the backing layer varies depending on the types and thickness of the support, and the constitution and thickness on the surface side. However, the thickness of the backing layer is commonly in the range of 0.1 to 10 $\mu$m.

Further, the surface of the backing layer is preferably roughened in order to minimize adhesion with other recording sheets, improve writability, and further improve conveyance properties in an ink jet recoding apparatus. For such purposes, fine organic or inorganic particles having a particle diameter of 2 to 20 $\mu$m are preferably employed.

Such a backing layer may be provided in advance, or may be provided after applying the coating composition of the present invention.

Preferably employed as coating methods of the ink absorption layer are a roll coating method, a rod bar coating method, an air knife coating method, a spray coating method, and a curtain coating method, or an extrusion coating method described in U.S. Pat. No. 2,681,294, in which a hopper is employed.

When polyolefin resin coated paper is used, drying is carried out approximately in the range of 0 to 80° C. When the temperature exceeds 80° C., the polyolefin resin is softened to cause problems in conveyance and to occasionally result in uneven gloss on the surface of the recording layer. The preferred drying temperature is between 0 and 60° C.

EXAMPLES

The present invention is specifically described with reference to the examples below. However the embodiments of the present invention are not limited to these examples. Further, "%" in examples shows absolutely dried percent by weight, unless otherwise specified.

Example 1

Low density polyethylene having a density of 0.92 was applied employing an extrusion coating method at a thickness of 30 $\mu$m onto the reverse surface of a 170 g/$m^2$ weight photographic base paper having a moisture content of 6.5 percent by weight. Subsequently, low density polyethylene having a density of 0.92, comprising 5.5 percent by weight of anatase type titanium oxide was applied at a thickness of 35 $\mu$m onto the surface employing a melt extrusion coating method. Thus, a support, laminated on both sides with polyethylene, was prepared. Immediately after melt extrusion coating, the polyethylene surface on the surface side was subjected to various embossing treatments employing a cooling roller having various regular height of roughness, while cooling. The embossing was varied while adjusting the density as well as the height of roughness.

The surface side was subjected to corona discharge, and a gelatin sublayer was applied at 0.3 g/$m^2$, while the reverse side was also subjected to corona discharge and then a latex layer was applied to obtain a thickness of 0.2 g/$m^2$.

Subsequently, the coating composition having the composition describes below was prepared for the surface.

"Preparation of Titanium Oxide Dispersion-1"

Twenty kg of titanium oxide having average particle diameter of about 0.25 $\mu$m (W-10, manufactured by Ishihara Sangyo) were added to 90 liters of a pH 7.5 aqueous solution comprising 150 g of sodium tripolyphosphate, 500 g of polyvinyl alcohol (PVA 235, manufactured by Kuraray Co., Ltd.), 150 g of cationic polymer (p-1), and 10 g of antifoaming agent SN381 marketed by Sun Nobuko Co., Ltd. The resulting mixture was dispersed employing a high pressure homogenizer (manufactured by Sanwa Kogyo Co., Ltd.). Then the total volume was adjusted to 100 liters to obtain uniform Titanium Oxide Dispersion-1.

"Preparation of Silica Dispersion-1"

Employing a jet stream-inductor mixer, TDS, manufactured by Mitamura Riken Kogyo Co., 125 kg of gas phase method silica (Aerosil 300, prepared by Nihon Aerosil Kogyo Co., Ltd.), having an average primary article diameter of 0.007 μm, were suction-dispersed at room temperature into 600 liters of pure water having a pH of 3.0, adjusted with nitric acid. The total volume was then adjusted to 660 liters employing pure water. "Preparation of Silica Dispersion-2"

Added while stirring 15 liters of an aqueous solution (at a pH of 2.3) comprising 1.29 kg of cationic polymer (P-1), 4.2 liters of ethanol, and 1.5 liters of n-propanol were 66.0 liters of Silica Dispersion-1, and 7.0 liters of an aqueous solution containing 260 g of boric acid and 230 g of borax. Subsequently, 1 g of the aforementioned antifoaming agent SN381 was also added.

The resulting mixture was dispersed employing a high pressure homogenizer manufactured by Sanwa Kogyo Co., Ltd., and the total volume was adjusted to 90 liters, employing pure water to prepare Silica Dispersion-2.

"Preparation of Fluorescent Whitening Agent Dispersion-1"

While heating, dissolved in 9,000 g of diisodecyl phthalate and 12 liters of ethyl acetate were 400 g of oil-soluble fluorescent whitening agent Uvitex-OB manufactured by Ciba-Geigy Co. Added to 65 liters of an aqueous solution containing 3,500 g of acid process gelatin, cationic polymer (P-1), and 6,000 ml of a 50 percent aqueous saponin solution was the resulting solution. The resulting mixture was emulsifying-dispersed employing a high pressure homogenizer manufactured by Sanwa Kogyo Co., Ltd. Then ethyl acetate was removed under reduced pressure and the total volume was adjusted to 100 liters. "Preparation Matting Agent Dispersion-1"

Added to 7 liters of pure water, containing 3 g of the aforementioned PVA 235, were 156 g of methacrylic ester based monodispersed matting agent MX-1500 manufactured by Sohken Kagaku Co., Ltd., and the resulting mixture was dispersed employing a high-speed homogenizer. The total volume was then adjusted to 7.8 liters. "Preparation of Coating Compositions"

First, second, and third layer coating compositions were prepared according to the following steps. First layer coating composition:

The following additives were successively added to 560 ml of Silica Dispersion-1, while stirring at 40° C.

(1) 10% Aqueous solution of polyvinyl alcohol (PVA 203, manufactured by Kuraray Kogyo Co., Ltd.) 0.6 ml (2) 5% Aqueous solution of polyvinyl alcohol (PVA 235, manufactured by Kuraray Kogyo Co., Ltd.) 260 ml (3) Fluorescent Whitening Agent Dispersion-1 22 ml (4) Titanium Oxide Dispersion-1 40 ml (5) Latex Emulsion AE-803, manufactured by Daiichi Kogyo Co., Ltd. 24 ml (6) Pure water to make 1000 ml Second Layer Coating Composition Successively mixed with 650 ml of Silica Dispersion-2 were the following additives, while stirring at 40° C.

(1) 10% Aqueous solution of polyvinyl alcohol (PVA 203, manufactured by Kuraray Kogyo Co., Ltd.) 0.6 ml (2) 5% Aqueous solution of polyvinyl alcohol (PVA 235, manufactured by Kuraray Kogyo Co., Ltd.) 270 ml (3) Fluorescent Whitening Agent Dispersion-1 30 ml (4) Pure water to make 1000 ml Third Layer Coating Composition Successively mixed with 650 ml of Silica Dispersion-2 were the following additives, while stirring at 40° C.

(1) 10% Aqueous solution of polyvinyl alcohol (PVA 203, manufactured by Kuraray Kogyo Co., Ltd.) 0.6 ml (2) 5% Aqueous solution of polyvinyl alcohol (PVA 235, manufactured by Kuraray Kogyo Co., Ltd.) 270 ml (3) Silicone dispersion (By-22-839, manufactured by Toray-Dow CorningSilicone Co., Ltd.) 3.5 ml (4) 50% Aqueous saponin solution 4 ml (5) Matting Agent Dispersion-1 10 ml (6) Pure water to make 1000 ml Coating compositions as described above were filtered employing the filters described below.

First layer and second layer: 2 filtering stages employing TCP 10 manufactured by Toyo Roshi Co., Ltd.

Third layer: 2 filtering stages employing TCP 30 manufactured by Toyo Roshi Co., Ltd.

Onto the aforementioned support, laminated on both sides with polyolefin, each layer was simultaneously coated in the order of the first layer (40 μm), the second layer (110 μm), and the third layer (30 μm). The parentheses show the wet thickness of each layer.

Coating was carried out in such a manner that each coating composition was coated at 40° C., employing a three-layer system slide hopper. Immediately after coating, the resultant coating was cooled for 20 seconds in a cooling zone maintained at 8° C., and then dried with air flow at 20 to 30° C. for 60 seconds, followed with air flow at 45° C. for 60 seconds, and then with air flow at 50° C. for 60 seconds. Thereafter, the coating was moisture-conditioned at 23° C. and relative humidity of 40 to 60 percent to obtain a recording sheet.

The first to third layers were confirmed to be porous films. Ratio of fine particles to hydrophilic binder was 6.0 by weight, and the void ratio was around 60% for every recording media 1 to 10.

Each of said obtained recording sheets was subjected to measurement of (1) the average roughness (Ra) of the surface on the ink absorptive side and (2) the glossiness (at 60 degrees) of the surface on the ink absorptive side.

Further, solid black printing as well as solid green printing was carried out employing an ink jet printer PM770C manufactured by Seiko-Epson Co., Ltd., and (3) the glossiness of the solid black printed area was measured. Furthermore, (4) the unevenness of the solid black printed area and (5) difference in glossiness between the solid green printed area and the non-printed area were visually evaluated.

Table 1 shows the results.

In Table 1, the visual evaluation of the unevenness of the solid green printed area and the difference in glossiness between the solid black printed area and the non-printed area was carried out employing the criteria shown below. Unevenness of solid green printed area:

A: no unevenness was evident

B: slight unevenness was noted, but the product was commercially viable

C: unevenness was noted which caused commercial viability problems

Difference in glossiness between the solid black printed area and the non-printed area A: difference in glossiness was hardly noted B: slight differences in glossiness were noted but the product was commercially viable C: differences in glossiness were noted which caused commercial viability problems D: differences in glossiness were noted which caused the major commercial viability problems Further, the average roughness (Ra) as well as the specular glossiness was measured employing the methods specified in the present specification. P-1

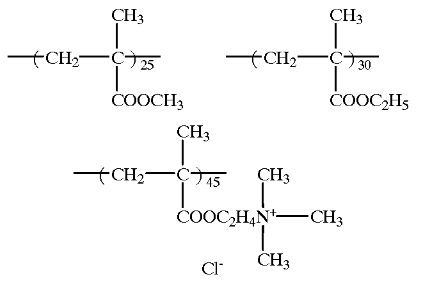

TABLE 1

| Recording Sheet | Ra (in μm) | Glossiness (in %) Before Printing | Glossiness (in %) Solid Black Area | Unevenness in Solid Green Area | Difference in Glossiness |
|---|---|---|---|---|---|
| -1 (Present Invention) | 1.25 | 15.2 | 17.2 | A | A |
| -2 (Present Invention) | 1.45 | 21.6 | 22.9 | A | A |
| -3 (Present Invention) | 2.41 | 15.2 | 15.9 | A | A |
| -4 (Present Invention) | 2.73 | 23.5 | 24.1 | A | A |
| -5 (Present Invention) | 0.86 | 27.5 | 31.1 | A | B |
| -6 (Present Invention) | 3.27 | 11.1 | 11.6 | B | A |
| -7 (Comparative Example) | 0.72 | 13.2 | 17.8 | A | C |
| -8 (Comparative Example) | 1.34 | 7.5 | 12.3 | A | D |
| -9 (Comparative Example) | 4.21 | 15.6 | 16.3 | C | A |
| -10 (Comparative Example) | 0.10 | 32.0 | 41.5 | C | D |

Ra: Roughness of the surface of the ink absorption layer side

From the results in Table 1, it can be seen that Recording Sheets-1 through -6 of the present invention which have an Ra of 0.8 to 4.0 μm and a specular glossiness of the surface of the ink absorptive side before printing of 10 to 30 percent exhibit minimal difference in glossiness between the solid black printed areas before and after printing, and minimize imagewise glare.

Further, it can be seen that on Recording Sheets-1 through -6 of the present invention, unevenness in the solid green printed area due to the surface roughness is minimized and high quality prints having a fine grained surface are obtained. Of them, it is found that Recording Sheets-1 through -4, having an Ra of 0.9 to 3.0 μm and a glossiness of 12 to 25 percent are considered to be excellent.

Contrary to the results described above, on Recording Sheet-7 (having an Ra of less than 0.8 μm and a glossiness of 13.2 percent), the decrease in the glossiness in the printed area is large enough to cause problems with imagewise glare.

Further, on Recording Sheet-8 having an Ra of 1.34 μm and a glossiness of less than 10 percent, the difference in glossiness is also large, and the visual difference in glossiness is quite pronounced, due to its original low glossiness. As a result, the quality of the print is greatly deteriorated.

Still further, on Recording Sheet 9 (having an Ra exceeding 4 μm), the difference in height of roughness is excessive and the unevenness in the green area is also quite pronounced. As a result, it is impossible to obtain high quality prints.

Still further, on Recording sheet-9, about 40 minute cracks having a length of about 0.5 to about 2 mm were formed per $m^2$ on the Recording Sheet (3 to 10 cracks on Recording Sheets-1 through -8). (under visual evaluation)

Example 2

Supports were prepared in such a manner that in Example 1, Ra of support surface was varied to have irregular roughness as shown in Table 2 by carving process with desired cooling roll. Recording media shown in Table 2 were prepared in the same way as Example 1 except that these supports were employed.

Recording Sheets were prepared by applying the coating composition employed in Example 1 onto said supports in the same manner as Example 1.

Said obtained Recording Sheets were evaluated in the same manner as Example 1. Table 2 below shows the results.

TABLE 2

| Recording Sheet | Ra (in μm) Support | Ra (in μm) Recording sheet | Glossiness (in %) Before Printing | Glossiness (in %) Solid Black Area | Unevenness in Solid Green Area | Difference in Glossiness |
|---|---|---|---|---|---|---|
| -11 (Present Invention) | 1.64 | 1.31 | 13.7 | 15.0 | A | A |
| -12 (Present Invention) | 1.52 | 1.25 | 23.2 | 24.9 | A | A |
| -13 (Present Invention) | 4.16 | 2.27 | 15.0 | 15.8 | A | A |
| -14 (Present Invention) | 3.22 | 1.87 | 21.7 | 22.8 | A | A |
| -15 (Present Invention) | 1.60 | 1.27 | 28.8 | 32.3 | A | B |
| -16 (Present Invention) | 1.87 | 1.35 | 11.2 | 13.6 | B | A |
| -17 (Comparative Example) | 0.70 | 0.74 | 13.2 | 16.9 | A | C |
| -18 (Comparative Example) | 1.72 | 1.22 | 8.2 | 12.0 | A | C |
| -19 (Comparative Example) | 5.52 | 4.18 | 13.1 | 14.2 | C | A |

As can clearly be seen in Table 2, it is found that Recording Sheets of the present invention exhibit the effects of the present invention in the same manner as Example 1.

Example 3

Recording Sheets were prepared in the same manner as Example 1, except that in Example 1, the matting agent in the third layer of the ink absorption layer of each Recording Sheet was eliminated. The resulting Recording Sheets were evaluated in the same manner as Example 1 and Recording Sheets of the present invention exhibited the effects of the present invention in the same manner as Example 1.

The ink jet recording sheet according to the present invention does not result in marked imagewise difference in glossiness between the printed area and the non-printed area, minimizes glare due to surface gloss, further does not form uneven images, and exhibits overall excellent effects.

Example 4

Supports were prepared in such a manner that in Example 1 wherein the support having polyethylene coat on both sides layer of the surface side prepared by fusion extrusion coating, except that the support was cooled just after fusion extrusion coating by smooth cooling rolls. In other words the supports were prepared in the same way as Example 1 except that the surface was not carving processed.

The first to the third layers same as recording medium 1 of the Example 1 were coated on the support thus obtained. Each layer was coated by three layer slide hopper with coating composition kept at 40° C., it was cooled in cooling zone kept at 8° C. for 20 seconds, air of 20 to 30° C. was blowed to dry the sample so far the surface lost stickiness. Then it was cooled by employing various cooling rolls having regular convex and concave height and humidity was controlled at 23° C. RH 40 to 60%, to obtain recording media shown in Table 3.

Each of the obtained recording sheets was subjected to measurement of (1) the average roughness (Ra) of the surface on the ink absorptive side and (2) the glossiness (at 60 degrees) of the surface on the ink absorptive side before printing was measured, and (3) the glossiness of the solid black printed area (4) the unevenness of the solid green printed area and (5) difference in glossiness between the solid black printed area and the non-printed area were visually evaluated in the same way as Example 1.

Further (6) ink absorption property was evaluated in the following way.

Evaluation of Ink Absorption

Water absorption volume of the ink absorption layer was measured in the following way to evaluate the ink absorption property.

Weight of dry state of the sample of recording medium of 10 cm square was measured as “a”. The sample was dipped in ion-exchanged water for 30 seconds, and weight was measured as “b” after just after water on the surface was wipe out. Support having no ink absorption layer was measured as “c”. The water absorption ratio was calculated by the following formula. Water absorption volume of the support was assumed as zero since the support of the sample is water non-absorption support.

Water absorption ratio =(b-a)/(a-c)

The absorption ratio is shown in Table 3.

TABLE 3

| Recording Sheet | Ra (in μm) | Glossiness (in %) Before Printing | Solid Black Area | Unevenness in Solid Green Area | Difference in Glossiness | Water Absorption Ratio |
|---|---|---|---|---|---|---|
| -21 (Present Invention) | 1.25 | 15.2 | 17.2 | A | A | 1.24 |
| -22 (Present Invention) | 1.45 | 21.4 | 23.1 | A | A | 1.24 |
| -23 (Present Invention) | 2.41 | 15.0 | 15.7 | A | A | 1.23 |
| -24 (Present Invention) | 2.73 | 23.8 | 24.6 | A | A | 1.22 |
| -25 (Present Invention) | 0.85 | 27.4 | 31.4 | A | B | 1.24 |
| -26 (Present Invention) | 3.27 | 11.3 | 11.7 | B | A | 1.23 |
| -27 (Comparative Example) | 0.72 | 13.3 | 17.8 | A | C | 1.27 |
| -28 (Comparative Example) | 1.34 | 7.5 | 12.3 | A | D | 1.24 |

TABLE 3-continued

| Recording Sheet | Ra (in μm) | Glossiness (in %) Before Printing | Solid Black Area | Unevenness in Solid Green Area | Difference in Glossiness | Water Absorption Ratio |
|---|---|---|---|---|---|---|
| -29 (Comparative Example) | 4.21 | 15.4 | 16.2 | C | A | 1.22 |
| -30 (Comparative Example) | 0.10 | 32.0 | 41.4 | C | D | 1.30 |

Incidentally water absorption ratio was measured in the same way for recording media samples 1 to 10 of Example 1. The result was around 1.30 for each samples.

The results of unevenness and difference in glossiness of recording media 21 to 30 are similar to the results of those of recording media 1 to 10 of the Example 1 as shown in the Tables. Water absorption ratio of recording media 21 to 30 is slightly lower than that of recording media 1 to 10 as being around 1.30.

What is claimed is:

1. An ink jet recording sheet having a support and an ink absorption layer provided on the support wherein a center line average roughness (Ra) is 1.0 to 5.0 μm, measured at a standard length of 2.5 mm and a cut-off value of 0.8 mm of the surface of the support on which the absorption layer is provided, which is specified in JISB-0601, and a 60-degree specular gloss of surface of the ink jet recording sheet on the ink absorption layer side is 10 to 30 percent, which is specified in JIS-Z8741.

2. The ink jet recording sheet of claim 1 wherein the support is a resin coated support.

3. The ink jet recording sheet of claim 1 wherein the ink absorption layer is a porous layer having voids.

4. An ink jet recording sheet having a support and an ink absorption layer provided on the support wherein a center line average roughness (Ra) is 1.0 to 5.0 μm, measured at a standard length of 2.5 mm and a cut-off value of 0.8 mm of the surface of the support on which the ink absorption layer is provided, which is specified in JISB-0601, a center line average roughness (Ra) is 0.8 to 4.0 μm, measured at a standard length of 2.5 mm and a cut-off value of 0.8 mm of the surface of the ink jet recording sheet on the ink absorption layer side, which is specified in JISB-0601,and a 60-degree specular gloss of surface of the ink jet recording sheet on the ink absorption layer is 10 to 30 percent, which is specified in JIS-Z8741.

5. The ink jet recording sheet of claim 4 wherein the center line average roughness (Ra) is 0.9 to 3.0 μm, measured at a standard length of 2.5 mm and a cut-off value of 0.8 mm of the surface of the ink jet recording sheet on the ink absorption layer side.

6. The ink jet recording sheet of claim 1 wherein center line average roughness (Ra) is 1.0 to 4.0 μm, measured at a standard length of 2.5 mm and a cut-off value of 0.8 mm of the surface of the support.

7. The ink jet recording sheet of claim 1 wherein the ink absorption layer is a porous layer having voids and containing hydrophilic binder and inorganic fine particles having an average particle diameter of no more than 100 nm.

8. The ink jet recording sheet of claim 7 wherein the inorganic fine particles are silica which is synthesized employing a gas phase method.

9. The ink jet recording sheet of claim 7 wherein ratio of the inorganic particles to hydrophilic binder is 2:1 to 10:1 by weight.

10. The ink jet recording sheet of claim 7 wherein void ratio is 40 to 80%.

11. The ink jet recording sheet of claim 1 wherein the ink absorption layer is a porous layer having voids and containing hydrophilic binder, inorganic fine particles having an average particle diameter of no more than 100 nm and a hardening agent.

12. The ink jet recording sheet of claim 1 wherein the ink absorption layer is a porous layer having voids and containing hydrophilic binder, inorganic fine particles having an average particle diameter of no more than 100 nm, a hardening agent and cationic mordant.

13. The ink jet recording sheet of claim 3 wherein the ink absorption layer is a porous layer having voids and containing hydrophilic binder and inorganic fine particles having an average particle diameter of no more than 100 nm.

14. The ink jet recording sheet of claim 13 wherein the ink absorption layer is a porous layer having voids and containing hydrophilic binder, inorganic fine particles and a hardening agent.

15. The ink jet recording sheet of claim 14 wherein the inorganic fine particles are silica, which is synthesized employing a gas phase method.

16. The ink jet recording sheet of claim 13 having a support and an ink absorption layer provided on the support wherein a center line average roughness (Ra) is 0.8 to 4.0 μm, measured at a standard length of 2.5 mm and a cut-off value of 0.8 mm of the surface of the ink jet recording sheet on the ink absorption layer side, which is specified in JISB-0601, and a 60-degree specular gloss of surface of the ink jet recording sheet on the ink absorption layer side is 10 to 30 percent, which is specified in JIS-Z8741.

17. The ink jet recording sheet of claim 16 wherein the center line average roughness (Ra) is 0.9 to 3.0 μm, measured at a standard length of 2.5 mm and a cut-off value of 0.8 mm of the surface of the ink jet recording sheet on the ink absorption layer side.

18. The ink jet recording sheet of claim 13 wherein the center line average roughness (Ra) of the support is 1.0 to 4.0 μm.

19. The ink jet recording sheet of claim 18 wherein the support is a resin coated support, the inorganic fine particles are silica, which is synthesized employing a gas phase method, and the ink absorption layer is a porous layer having voids and containing hydrophilic binder, inorganic fine particles and a hardening agent.

* * * * *